Aug. 13, 1957 E. LECLUYSE ET AL 2,802,412
APPARATUS FOR PRINTING ON PLASTIC SURFACES
Filed Nov. 17, 1953

INVENTORS:
*Edourd Lecluyse,*
*Albert Quinche,*
BY *Cushman, Darby & Cushman*
ATTORNEYS.

United States Patent Office

2,802,412
Patented Aug. 13, 1957

2,802,412

APPARATUS FOR PRINTING ON PLASTIC SURFACES

Edouard Lecluyse, Vevey, and Albert Quinche, St-Sulpice, Switzerland, assignors to Unitubo S. A., Vevey, Switzerland, a corporation of Switzerland Application November 17, 1953, Serial No. 392,666

2 Claims. (Cl. 101—36)

This invention relates to a novel process and apparatus for improving the printing properties of plastic material, and, more particularly, for the printing of a plastic tubular body of the polyethylene type. The process basically comprises subjecting such body to differential heat treatment whereby the printing surface thereof is subjected to an elevated temperature sufficient to soften the same but not in excess of temperatures compatible with the stability of the plastic material, while the remainder of the said body is heated to a temperature below the minimum temperature effective for the said printing surface treatment and thereafter applying printing matter to the printing surface while the latter is in the heat-softened state.

It is well-known that the printing of plastics has provided many difficulties heretofore due to the non-adherence of printing inks to plastic surfaces. This problem is particularly prevalent in the case of plastics of the polyethylene type.

Specific problems that arise involve the non-adherence of printing ink on a polyethylene surface after a short period following the initial printing operation. Heretofore, the printing would be easily obliterated by any slight abrasive action or other contact between the printed plastic surface and external forces.

The primary object of this invention is to provide a method for improving the bonding properties of such plastics so as to enable printing inks to permanently adhere thereto.

Another object of this invention is to provide a process for printing on the surface of a plastic body comprising subjecting said surface to an elevated temperature sufficient to soften the same but not in excess of its deformation temperature and simultaneously heating the remainder of the body to a temperature below the minimum temperature effective for the said printing surface treatment and thereafter applying printing matter to the printing surface while the latter is in the heat-softened state.

Still another object of this invention is to provide a method for printing on the external surface of a polyethylene tubular body comprising placing said tubular body on a metal mandrel, contacting said mandrel and tubular body with an open flame thereby heating said tubular body both externally and internally, printing on the softened external surface, and thereafter baking said body to permanently set the printed surface.

Still further objects and the entire scope of applicability of the present invention will become apparent from the detailed description given hereinafter. It should be understood, however, that the detailed description and specific examples, while indicating the preferred embodiments of the invention are given by way of illustration only, since the various changes and modifications within the spirit and scope of the invention will become apparent to those skilled in the art from this detailed description.

The present invention is based on the discovery that the surface of a polyethylene body can be permanently printed upon if the said surface is heat-softened by contact with an open flame, and, at the same time, the remainder of the body is heated at a lower temperature than that of the treating flame. The printing takes place while the said surface of the polyethylene is still in the heat-softened condition.

The printing that results is far more adherent to the polyethylene than that realized heretofore in the art. The printed surface can withstand great amounts of abrasive force with no visible effect. In addition, the character of the printing is far more distinct than that attained heretofore. Much finer lettering can be applied with no sacrifice of readability.

The novel process that accomplishes such advantages involves the fact that both the printing surface and the remainder of the polyethylene body being treated are subjected to heat and that the actual printing is carried out while the printing surface is still in the heat-softened state. It should be noted that a temperature differential exists between the temperature at which the printing surface is being heated and that to which the remainder of the body is subjected. Typically, the flame treated printing surface is treated by a temperature of about 1300° C. whereas the remainder of the body is heated by conduction to a temperature of about 80° C. Of course, these temperatures can vary over a certain range, to wit, the flame treatment from a temperature of about 800° C. to 2100° C. and the heating of the remainder of the body by conduction in the case of ordinary polyethylenes from a temperature of 50° C. to 90° C. It is, of course, not practical to give definite temperature limits. For any specific case, depending on the character of the plastic involved, those skilled in the art will be able to determine by simple experiment, the best conditions once they have become familiar with the principles of this invention. The temperature ranges noted heretofore have been found to be preferable for polyethylene materials now commercially available.

The novel process comprising this invention may be illustrated by the following example. A polyethylene tube of 0.03 inch thickness is placed on a metal mandrel and then a gas flame is impinged thereon as the mandrel and tube are rotated. This flame acts in two ways. It both directly heats the surface of the polyethylene tube and heats the portion of the metal mandrel that extends outwardly from the end of the said tube. The latter act causes a convective heating of the internal surface of the tubular body but at a temperature far lower than the temperature of the heating gas flame. The actual temperature noted was 1300° C. for the gas flame and 80° C. for the metal mandrel. Heating was carried out until the external surface of the tubular body reached a softened state short of the deformation point and then the tube was printed upon while still on the cylindrical metal mandrel by contact with a rotary off-set printing cylinder of standard design. The time necessary for heating is merely a time sufficient to heat-soften the surface and depends on the size of the tube, heat of the flame and the like.

The surface was then baked for 15 minutes at 80° C. to harden the same and set the printing. It should be noted that the resulting printing surface exhibited a much better bond to printing inks than realized heretofore. The time and temperature of baking can be from 5 to 45 minutes and 90° C. to 65° C. respectively for polyethylene.

The foregoing method can advantageously be used on a commercial scale in the manufacture of quantities of printed tubular bodies of polyethylene material. Reference is made to the accompanying drawing which illustrates utilization of this invention on such commercial scale. In the drawing.

Figure 1:
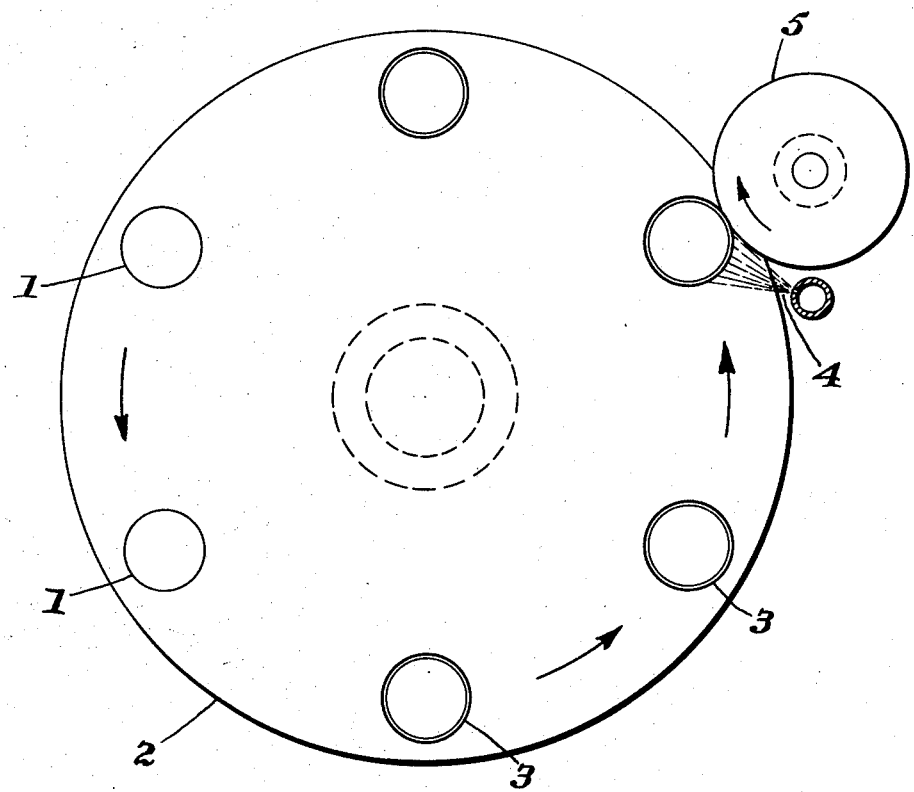
Figure 1 is a face view of the entire heat treating and printing assembly.
Figure 2:
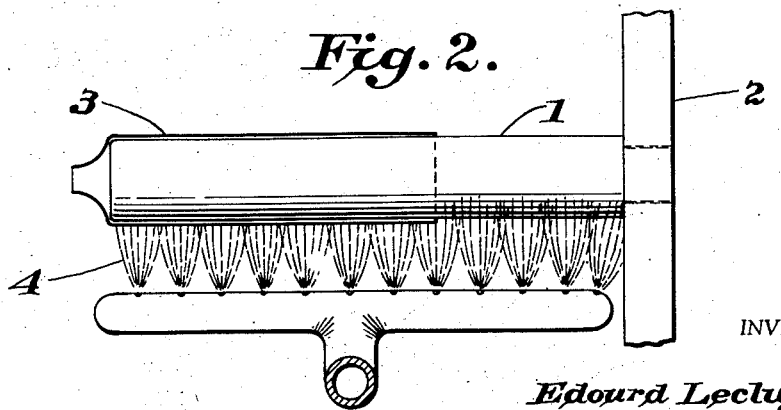
Figure 2 is a side elevation view of a single tubular body and mandrel assembly being heat treated.

Referring to the drawing, a series of freely rotatable metal mandrels 1 are mounted on a rotatable disc 2 and a number of tubular bodies 3 inserted on said mandrels. The disc is then rotated in close proximity to a gas flame 4 so that each mandrel assembly is successively exposed to said flame. A rotary printing cylinder assembly 5 is used in conjunction with this apparatus so as to accomplish printing immediately following the heating operation described heretofore. The disc or rotatable base 2 and the cylinder 5 are rotated in the direction of the arrows (Fig. 1) by any suitable means (not shown), so that the mandrels carrying the polyethylene tubes are each sequentially subjected to the heating means or gas flame 4 as the tube is moved past the same. Baking would, of course, follow the printing operation so as to permanently set the printed surface.

The speed of rotation of the disc is, of course, governed by the amount of work pieces intended to be processed in a given time as well as by the size of the apparatus. It should be appreciated that disc rotation is momentarily interrupted during the printing operation and is then resumed to swing the next mandrel assembly into line for treatment.

In summation, it can be stated that this invention refers to a method of improving the bonding properties of plastic bodies, typically, polyethylene, which comprises subjecting the said body to a differential heat treatment whereby its printing surface is flame-treated to its softening point, short of deformation, and the remainder is heat-treated at a far lower temperature, followed by immediate printing while the printing surface is in the softened state.

It should be stressed that the foregoing process can be utilized for many types of plastic, but is particularly designed for printing on polyethylene in view of the problem that existed heretofore in connection with printing on such material. The term polyethylene as used in this specification and claims is to be understood to include all polyethylene type resins.

The novel principles of this invention are broader than the specific embodiments recited above, and rather than unduly extend this disclosure by attempting to list the numerous modifications which have been conceived and reduced to practice during the course of this development, these novel features are defined in the following claims.

I claim:

1. Apparatus for printing on the surface of a plastic tubular body comprising an intermittently rotatable disc, a number of rotatable cylindrical metal mandrels attached to said disc and adapted to have a plastic tubular body mounted thereon, each of said mandrels being longer than the plastic tubular body mounted thereon, a stationary heating means adjacent said rotatable disc whereby each of said mandrels is sequentially moved past said heating means upon rotation of said disc, and a rotary printing cylinder assembly mounted immediately following said heating means and positioned to print on the surface of the plastic tubular bodies mounted on each of said rotatable mandrels and while each of the plastic bodies is still soft.

2. Apparatus for printing on the surface of a plastic tubular body including a rotatable base, a mandrel extending outwardly from the base and adapted to have a plastic tubular body mounted thereon, the plastic tubular body being of less length than the mandrel and axially slidable thereon so as to expose a portion of the mandrel, a gas burner positioned to project a flame longitudinally of the mandrel so as simultaneously to heat the exterior surface of the tubular body and the exposed portion of the mandrel as the latter is rotated in order to subject the tubular body to differential heat treatment on its inner and outer surfaces, and means for printing on the outer surfaces of the tubular body while the tubular body is in a heat-softened state.

References Cited in the file of this patent

UNITED STATES PATENTS

| | | |
|---|---|---|
| 1,904,332 | Sidebotham | Apr. 18, 1933 |
| 2,331,991 | McElwain | Oct. 19, 1943 |
| 2,632,921 | Kreidl | Mar. 31, 1953 |
| 2,648,097 | Kritchever | Aug. 11, 1953 |